Dec. 6, 1966 J. V. FISHER 3,289,422

COOLING APPARATUS FOR INFRARED DETECTING SYSTEM

Filed Aug. 16, 1965

INVENTOR.
JOSEPH V. FISHER
BY [signature]
ATTORNEY 3,289,422

COOLING APPARATUS FOR INFRARED DETECTING SYSTEM

Joseph V. Fisher, Ridge Road, R.F.D. 1, Valencia, Pa.

Filed Aug. 16, 1965, Ser. No. 479,787
14 Claims. (Cl. 62—3)

This invention relates to cooling apparatus, and more particularly to cooling apparatus employing magnetically enhanced thermoelectric devices, for use in an infrared detecting system of the type having a detecting element and circuit means for indicating the incidence of electromagnetic radiation on the detecting element.

As is known, infrared detecting systems employ a detecting element which is subjected to a bias current. When infrared wave energy strikes the detecting element, the number of current carriers increases. This is reflected in a decrease in the resistance of the detector, ultimately creating a signal voltage at the preamplifier input. Circuit means is available for indicating the incident infrared wave energy.

The infrared detecting element may be made of, for example, indium antimonide, stoichiometric, non-stoichiometric or doped with impurities. Other infrared detecting elements are indium arsenide, lead selenide, lead telluride, gold-doped germanium, and others.

In infrared detecting systems of the type described, the detecting element must be cooled to about 77° K. in order to be at peak efficiency. Furthermore, the detecting element must reside in a vacuum to prevent its deterioration. Consequently, it has heretofore been necessary to mount the infrared detecting element, for example, on a copper block and enclose the entire structure in evacuated glass or metal dewars. The copper block was cooled by liquid nitrogen or other suitable liquefied gases.

The inherent disadvantages accompanying this method of cooling the infrared detecting element should be evident. For example, liquefied nitrogen will evaporate, regardless of the insulating jacket surrounding it. Therefore, if the infrared detecting system is to continue to operate satisfactorily, it is necessary to stock additional quantities of liquid nitrogen to replace the evaporated quantity of liquid nitrogen. Hence, the greatest disadvantage of this method of cooling is that the operating time of the infrared detecting system is limited by the quantity of coolant available. Another disadvantage is that the efficiency of the cooling system is not maximized in that the detecting element is not in direct physical contact with the cooling medium. That is to say, since the copper block separates the detecting element from the coolant, there is a loss in the heat conduction, due to the thermal conductivity of the copper, between the detecting element and the coolant material. A further disadvantage is that the cooling apparatus itself has been bulky thereby taking up a considerable amount of space.

Accordingly, as an overall object, the present invention seeks to provide improved cooling apparatus for infrared detecting system of the type described, which cooling apparatus is not subject to the above-described disadvantages.

Another object of the invention is to provide an improved cooling apparatus incorporating magnetically enhanced thermoelectric refrigerating devices employing a readily available electric power source.

Still another object of the invention is to provide cooling apparatus wherein the detecting element is in direct physical contact with the cooling apparatus whereby heat conduction from the detecting element to the heat sink is maximized.

A further object of the invention is to provide cooling apparatus for infrared detecting systems which is of compact size.

In accordance with the present invention, cooling apparatus is provided comprising multistage, thermoelectric refrigerating devices and a magneto-thermoelectric prism which is thermally and electrically bonded to the last of the thermoelectric refrigerating devices. Means is provided for passing an electric current through the devices and the prism. A temperature drop is produced in the thermoelectric refrigerating devices by the Peltier effect. To enhance this effect, that is, cause a further temperature drop to be produced, means is provided for impressing a magnetic field across at least the last stages and preferably all of the stages of the thermoelectric refrigerating devices. A temperature drop also is produced in the magneto-thermoelectric prism by the Ettingshausen effect which, of course, requires a magnetic field. The impressed magnetic field extends perpendicular to the flow of current through the devices and the prism and has a flux density in the range of about 500 gauss to about 50,000 gauss.

The infrared detecting element is thermally but non-electrically bonded directly to the free edge, that is, the coolest area, of the magneto-thermoelectric prism. The overall arrangement is such that the cooling apparatus of the invention provides the low temperature required for operating the infrared detecting element and yet employs a readily available electric power source and is of compact size. An enclosure is provided which encapsulates at least the infrared detecting element and the prism and preferably the infrared detecting element and the entire cooling apparatus. The enclosure is evacuated whereby the infrared detecting element and the cooling apparatus reside in a vacuum. The evacuated environment in which the infrared detecting element and the cooling apparatus reside, prevents deterioration of the infrared detecting element and prevents the formation of frost due to condensing moisture which, if permitted to form, would lower the efficiency of the cooling apparatus and be detrimental to the infrared detecting element.

The above and other objects and advantages of the present invention will become apparent from the following detailed description by reference to the accompanying drawing, in which.

Figures 1, 2, 3, 4, 5, 6, 7, 8:
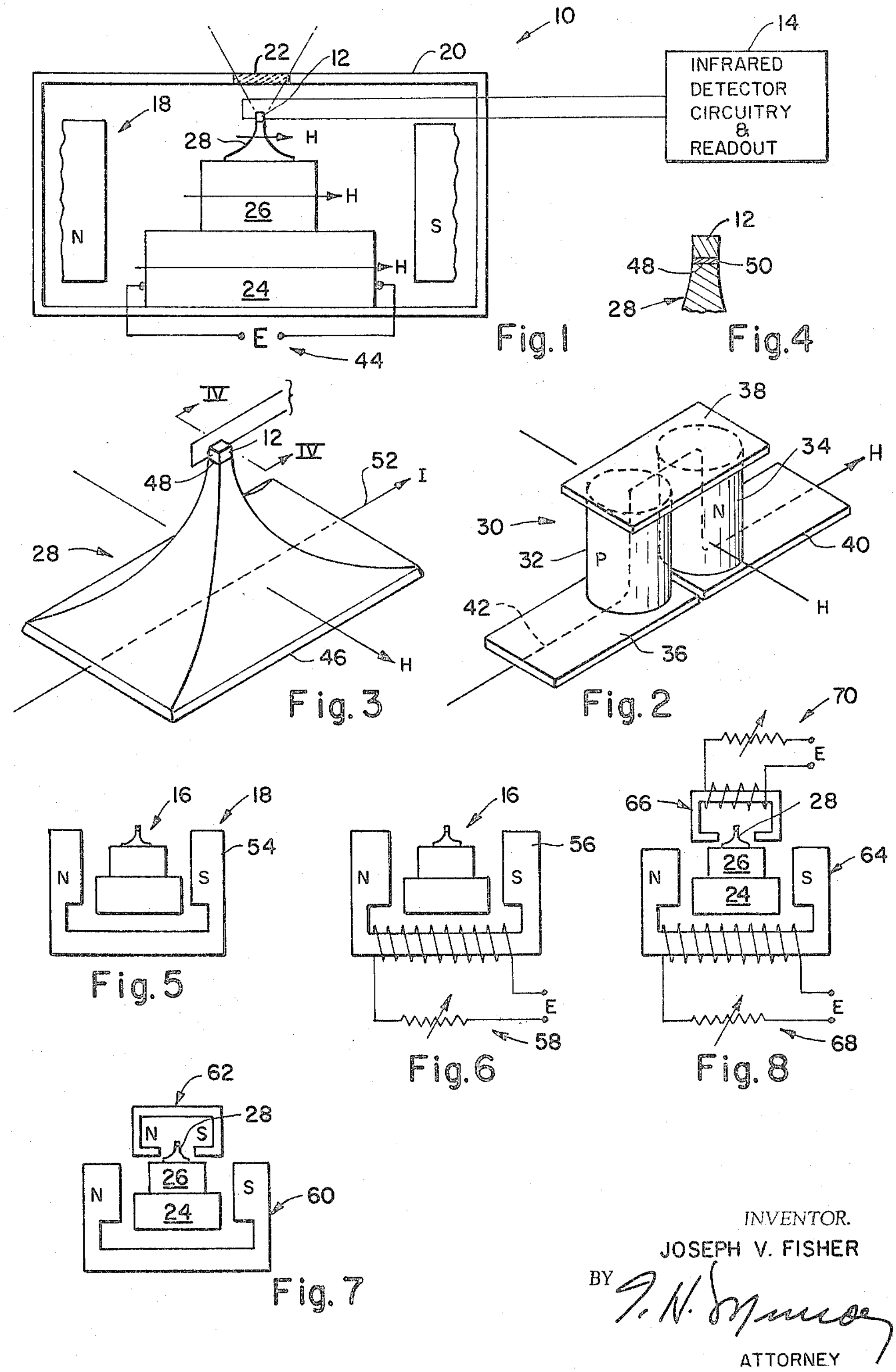
FIGURE 1 is a cross-sectional view schematically illustrating an infrared detecting system employing the cooling apparatus of the invention.
FIG. 2 is an isometric view illustrating a magnetically enhanced thermoelectric refrigerating device.
FIG. 3 is an isometric view schematically illustrating a magneto-thermoelectric prism.
FIG. 4 is a cross-sectional view taken along the line IV—IV of FIG. 3.
FIGS. 5, 6, 7 and 8 are views schematically illustrating means for impressing a magnetic field across the thermoelectric refrigerating devices and the magneto-thermoelectric prism.

Referring now to FIG. 1, there is schematically illustrated an infrared detecting system 10 comprising, in general, an infrared detecting element 12 operatively connected to circuit means 14 for indicating the incidence of infrared wave energy on the detecting element 12; cooling means 16 for cooling the detecting element 12 to the required operating temperature; magnet means 18 for impressing a magnetic field across the elements of the cooling means 16; and an enclosure 20 enclosing the element 12, the cooling means 16 and the magnet means 18 in a vacuum. The enclosure 20 includes a window or port 22 through which infrared wave energy passes and strikes the detecting element 12.

The cooling means 16 is schematically illustrated and comprises multistage, thermoelectric refrigerating devices shown grouped into first or initial stages 24 and remaining stages 26; and a magneto-thermoelectric prism 28.

Each stage of the thermoelectric devices comprises a plurality of P–N couples 30, one of which is illustrated in FIG. 2. As is known, the P–N couple 30 comprises a p-type element 32 and an n-type element 34 which are electrically connected in series by means of straps 36, 38 and 40. The elements 32, 34 are formed from semimetal and/or semiconductor materials. The well-known Peltier effect is operative in the P–N couple 30 when a current I is caused to flow along the dotted-line path 42. That is to say, a temperature drop is produced whereby the outer surface of the strap 38 is colder than the lower surface of the straps 36, 40. To enhance or increase the Peltier effect, a magnetic field H of appropriate field strength, is impressed across the P–N couple 30 and perpendicular to the current flow through the P–N couple 30.

In the cooling means 16, it is preferred that a large stage be used to cool a smaller stage—this being known as cascading. Thus, in the cooling means 16, the initial stage will contain the largest number of the P–N couples 30 while the last stage will contain the least number of the P–N couples 30. Furthermore, the P–N couples 30 of the cooling means 16 are preferably electrically connected in series so that a single power source 44 may be employed to provide the current I.

The p-type and n-type elements 32, 34 employed in the first stages 24 of the cooling means 16, are preferably formed from semiconductive materials, such as, bismuth-telluride and lead-telluride and may or may not be magnetically enhanced.

The p-type and n-type elements 32, 34 employed in the remaining stages 26 are preferably formed from semimetal materials, such as, bismuth-antimony, bismuth, bismuth, bismuth-lead, bismuth-gold, bismuth-thallium, bismuth-mercury and are magnetically enhanced by an impressed magnetic field. Alternatively, the p-type and n-type elements 32, 34 of the remaining stages 26, may be mixed couples, that is, formed from the semimetal and semiconductor materials listed above. Again, these couples are preferably magnetically enhanced. The overall effect of the cascaded thermoelectric devices is that a temperature drop of approximately 123° K. or greater is achieved.

The magneto-thermoelectric prism 28 is shaped to correspond to an infinite cascading or an infinite series of magneto-thermoelectric devices. This shaping achieves considerably greater cooling than a single rectangular block or a series of small bars stacked one on top of the other. As illustrated in FIG. 3, the magneto-thermoelectric prism 28 has a base 46 of large area and a peak or edge 48 which is remote from the base 46 and which has a relatively small area compared to the base 46. As can best be seen in FIG. 4, the infrared detecting element 12 is thermally but nonelectrically bonded to the peak 48, for example, by mean of adhesive 50. The adhesive 50 should be a good conductor of heat having a high *k* factor or thermal conductivity and be an effective electrical insulator, i.e., having a high resistivity.

The magneto-thermoelectric prism 28 may comprise alloys of bismuth-antimony, bismuth-tellurium, bismuth-lead, bismuth-arsenic, bismuth-sulfur, bismuth-selenium, bismuth-thallium, bismuth-mercury, bismuth-gold and the like.

The base 46 of the magneto-thermoelectric prism 28 is thermally and electrically bonded to the cool face of the last thermoelectric device and receives a current I which flows through the prism 28 in the direction indicated by the arrow 52. The Ettingshausen effect is operative in the prism 28 when a magnetic field H is impressed across the prism 28 perpendicular to the flow of the current I. The Ettingshausen effect produces a temperature drop across the prism 28 whereby the peak 48 is cooler than the base 46. Inasmuch as the thermoelectric devices achieve a temperature drop of approximately 123° K. or greater, the prism 28 is required to achieve a temperature drop of only approximately 100° K. or less. This overall temperature drop of approximately 223° K. is based on the assumption that the first stage of the thermoelectric devices operates at a background or heat sink temperature of approximately 300° K. Thus, the required 77° K. operating temperature for the infrared datecting element 12 is achieved. Of course, when the background temperature is lowered, the temperature drop through the cooling means 16 will effect a corresponding lowering in the temperature of the peak 48 of the prism 28.

The magnet means 18 which impresses a magnetic field H across the cooling means 16 preferably comprises a single permanent magnet 54 illustrated in FIG. 5. The permanent magnet 54 produces a magnetic field having a flux density in the range of from about 500 gauss to about 12,000 gauss.

Alternative means for impressing a magnetic field across the cooling means 16 are illustrated in FIGS. 6–8, inclusive. Corresponding numerals will be employed to identify corresponding parts heretofore described.

In FIG. 6, the magnet means comprises a single electromagnet which produces the required magnetic field. The electromagnet 56 includes a variable voltage power source 58 by which the field intensity and, hence, the flux density of the electromagnet 56 may be varied.

In FIG. 7, the magnet means comprises a first permanent magnet 60 and a second permanent magnet 62. The magnet 60 impresses a magnetic field across the thermoelectric elements of the first stages 24 and the remaining stages 26 while the magnet 62 impresses a separate magnetic field across the magneto-thermoelectric prism 28.

In FIG. 8, the magnet means comprises first and second electromagnets 64, 66. The first electromagnet 64 having a variable voltage power source 68, is employed to impress a magnetic field whose flux density may be varied, across the thermoelectric elements of the first stages 24 and the remaining stages 26. The second electromagnet 66 having a variable voltage power source 70, is employed to impress a separate magnetic field whose flux density may be varied, across the magneto-thermoelectric prism 28.

The amount of cooling which can be achieved by the cooling means 16 is indicated by the dimensionless quantity known as the figure of merit (Z). The figure of merit is a function of the thermoelectric power, the electrical resistivity and the thermal conductivity of the materials employed in making the thermoelectric refrigerating devices and the magneto-thermoelectric prism. All of these properties are affected by a magnetic field. The overall result is that the figure of merit is increased in the presence of a magnetic field. For example, a figure of merit of about 5.5 units is achieved with the cooling apparatus of the present invention. This is to be compared to a figure of merit of 3 units obtainable through the use of the best commercially available semiconductor materials.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In an infrared detecting system of the type having an infrared detecting element and circuit means operatively connected to said infrared detecting element for indicating the incidence of infrared wave energy on said infrared detecting element, the combination comprising: means for cooling said infrared detecting element comprising multistage, thermoelectric refrigerating devices, a magneto-thermoelectric prism having a base thermally and electrically connected to the last of said thermoelectric refrigerating devices and an edge remote from said base to which said infrared detecting element is thermally and nonelectrically bonded, means for passing a current through said thermoelectric refrigerating devices and said magneto-thermoelectric prism, and means for impressing a magnetic field across at least the thermoelectric refrigerating devices of the last stages and said magneto-thermoelectric prism and perpendicular to the current flow therethrough; and means for encapsulating at least said infrared detecting element and said magneto-thermoelectric prism, said encapsulating means being evacuated whereby said infrared detecting element and said magneto-thermoelectric prism reside in a vacuum.

2. The combination of claim 1 wherein said magnetic field has a flux density in the range of from about 500 gauss to about 50,000 gauss.

3. The combination of claim 1 wherein said means for applying a magnetic field comprises at least one permanent magnet.

4. The combination of claim 1 wherein said means for applying a magnetic field comprises at least one electromagnet.

5. The combination of claim 1 wherein said means for applying a magnetic field comprises at least one permanent magnet for impressing a magnetic field across the thermoelectric refrigerating devices and a single permanent magnet for impressing a magnetic field across said magneto-thermoelectric prism.

6. The combination of claim 1 wherein said means for applying a magnetic field comprises at least one electromagnet for impressing a magnetic field across said thermoelectric refrigerating devices and an electromagnet for impressing a magnetic field across said magneto-thermoelectric prism.

7. In an infrared detecting system of the type having an infrared detecting element and circuit means operatively connected to said infrared detecting element for indicating the incidence of infrared wave energy on said infrared detaching element, the combination comprising: means for cooling said infrared detaching element comprising multistage, thermoelectric refrigerating devices the initial stages of which comprise semiconductor P-N couples and the remaining stages of which comprise semimetal P-N couples, a magneto-thermoelectric prism having a base thermally and electrically bonded to the last of said thermoelectric refrigerating devices and an edge remote from said base to which said infrared detaching element is thermally and nonelectrically bonded, means for passing a current through said thermoelectric refrigerating devices and said magneto-thermoelectric prism, and means for passing a magnetic field across at least said semimetal P-N couples and said magneto-thermoelectric prism and perpendicular to the current flow therethrough; and means for encapsulating at least said infrared detecting element and said magneto-thermoelectric prism, said encapsulating means being evacuated whereby said infrared detecting element and said magneto-thermoelectric prism reside in a vacuum.

8. In an infrared detecting system of the type having an infrared detecting element and circuit means operatively connected to said infrared detecting element for indicating the incidence of infrared wave energy on said infrared detecting element, the combination comprising: means for cooling said infrared detecting element comprising multistage, thermoelectric refrigerating devices the initial stages of which comprise semiconductor P-N couples and the remaining stages of which comprise semimetal-semiconductor P-N couples, a magneto-thermoelectric prism having a base thermally and electrically bonded to the last of said thermoelectric refrigerating devices and an edge remote from said base to which said infrared detecting element is thermally and nonelectrically bonded, means for passing a current through said thermoelectric refrigerating devices and said magneto-thermoelectric prism, and means for passing a magnetic field across at least said semimetal-semiconductor P-N couples and said magneto-thermoelectric prism and perpendicular to the current flow therethrough; and means for encapsulating at least said infrared detecting element and said magneto-thermoelectric prism, said encapsulating means being evacuated whereby said infrared detecting element and said magneto-thermoelectric prism reside in the vacuum.

9. In an infrared detecing system of the type having an infrared detecting element and circuit means operatively connected to said infrared detecting element for indicating the incidence of infrared wave energy on said infrared detecting element, the combination comprising: means for cooling said infrared detecting element comprising multistage, thermoelectric refrigerating devices, a magneto-thermoelectric prism having a base thermally and electrically connected to the last of said thermoelectric refrigerating devices and an edge remote from said base to which said infrared detecting element is thermally and nonelectrically bonded, said thermoelectric refrigerating devices and said magneto-thermoelectric prism being electrically connected in series, single means for passing a current through said thermoelectric refrigerating devices and said magneto- thermoelectric prism, and means for impressing a magnetic field across said thermoelectric refrigerating devices and said magneto-thermoelectric prism and perpendicular to the current flow therethrough; and means for encapsulating said infrared detecting element, said magneto-thermoelectric prism and said thermoelectric refrigerating devices, said encapsulating means being evacuated whereby said infrared detecting element and said cooling means reside in a vacuum.

10. In cooling apparatus, the combination comprising: a plurality of thermoelectric refrigerating devices, said thermoelectric refrigerating devices being cascaded wherein a large device is employed to cool a smaller device; a magneto-thermoelectric prism having a base thermally and electrically connected to the last of said thermoelectric refrigerating devices and an edge remote from said base; means for passing a current through said thermoelectric refrigerating devices and said magneto-thermoelectric prism; and means for impressing a magnetic field across at least the latter stages of said thermoelectric devices and said magneto-thermoelectric prism, said magnetic field extending perpendicular to the current flow through said thermoelectric devices and said magneto-thermoelectric prism.

11. In cooling apparatus, combination comprising: a plurality of thermoelectric refrigerating devices arranged in cascaded relation wherein a large device is employed to cool a smaller device; a magneto-thermoelectric prism having a base, an edge remote from said base and a diminishing cross-sectional area from said base to said edge, said base being thermally and electrically connected to the last of said thermoelectric refrigerating devices; said thermoelectric refrigerating devices and said magneto-thermoelectric prism being electrically connected in series; single means for passing a current through said thermoelectric refrigerating devices and said magneto-thermoelectric prism; and means for impressing a magnetic field across at least the later stages of said thermoelectric devices and said magneto-thermoelectric prism, said magnetic field extending perpendicular to the current flow through said thermoelectric refrigerating devices and said magneto-thermoelectric prism.

12. In cooling apparatus, the combination comprising: a plurality of thermoelectric refrigerating devices disposed in cascaded relation whereby a large device is employed to cool a smaller device; a magneto-thermoelectric prism having a base thermally and electrically connected to the last of said thermoelectric refrigerating devices and an edge remote from said base, said magneto-thermoelectric prism being shaped to correspond to an infinite series of magneto-thermoelectric devices; means for passing a current through said thermoelectric refrigerating devices and said magneto-thermoelectric prism; and means for impressing a magnetic field across at least the latter stages of said thermoelectric devices and said magneto-thermoelectric prism, said magnetic field extending perpendicular to the current flow through said thermoelectric refrigerating devices and said magneto-thermoelectric prism.

13. The combination of claim 12 wherein said thermoelectric refrigerating devices comprise a multistage cooler where the initial stages comprise semiconductor P-N couples and the remaining stages comprise semimetal P-N couples.

14. The combination of claim 12 wherein said thermoelectric refrigerating devices comprise a multistage cooler wherein the initial stages comprise semiconductor P-N couples and the remaining stages comprise semimetal semiconductor P-N couples.

References Cited by the Examiner

UNITED STATES PATENTS

| | | | |
|---|---|---|---|
| 3,064,440 | 11/1962 | Waller | 250—83.3 |
| 3,079,504 | 2/1963 | Hutchens | 250—83.3 |
| 3,090,207 | 5/1963 | Smith | 62—3 |
| 3,103,587 | 9/1963 | Ure | 250—83.3 |
| 3,154,927 | 11/1964 | Simon | 62—3 |
| 3,188,240 | 6/1965 | Lee | 62—3 |
| 3,224,206 | 12/1965 | Sizelove | 62—3 |

WILLIAM J. WYE, *Primary Examiner.*